No. 697,906. Patented Apr. 15, 1902.
J. WHITEHEAD.
TORPEDO LAUNCHING APPARATUS.
(Application filed July 24, 1901.)
(No Model.) 7 Sheets—Sheet 1.
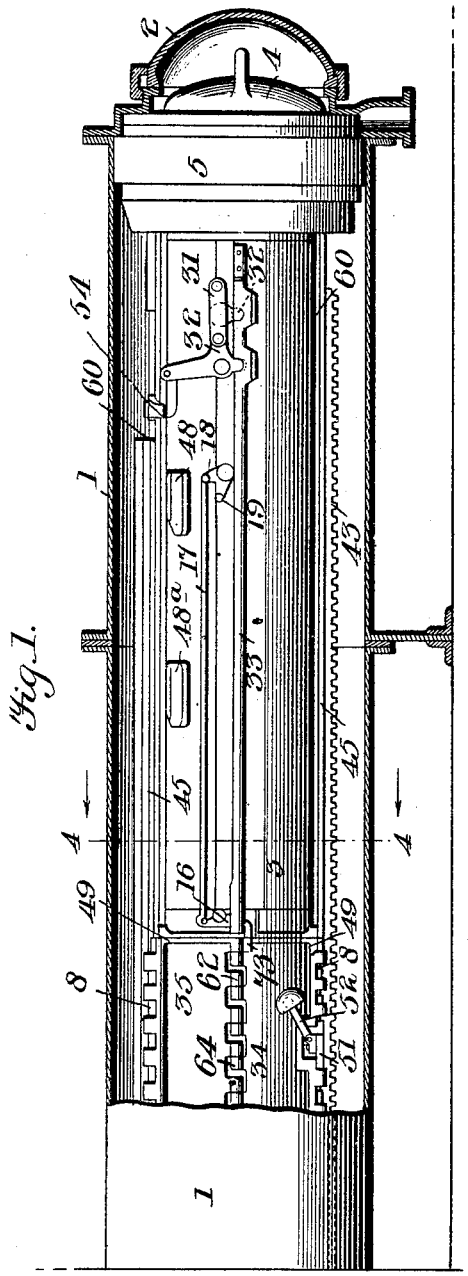
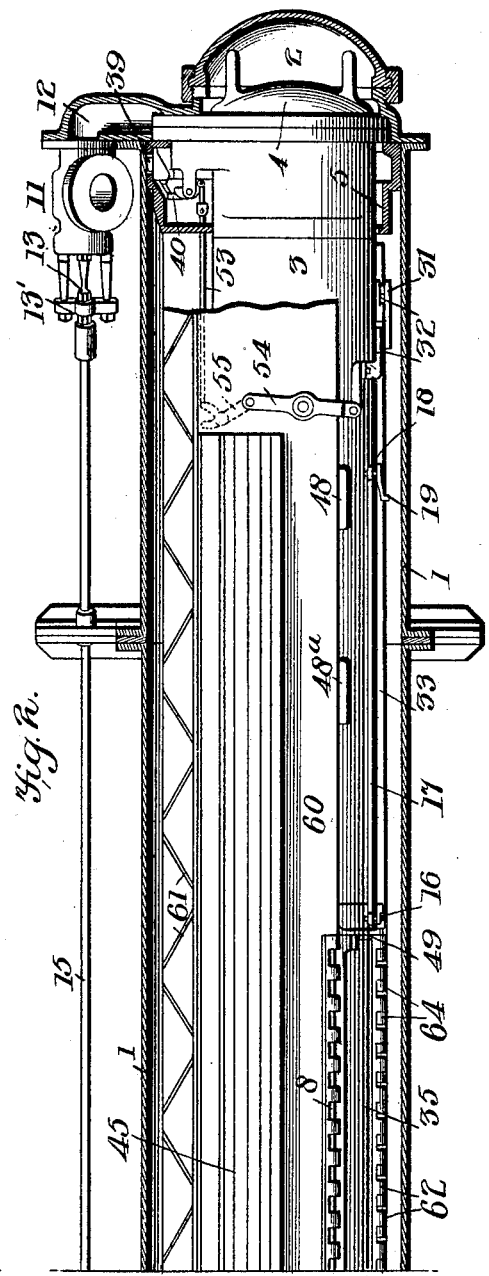
Witnesses
Geo. H. Byrne
John N. Halk
Inventor
John Whitehead
By Wilkinson & Fisher
Attorneys

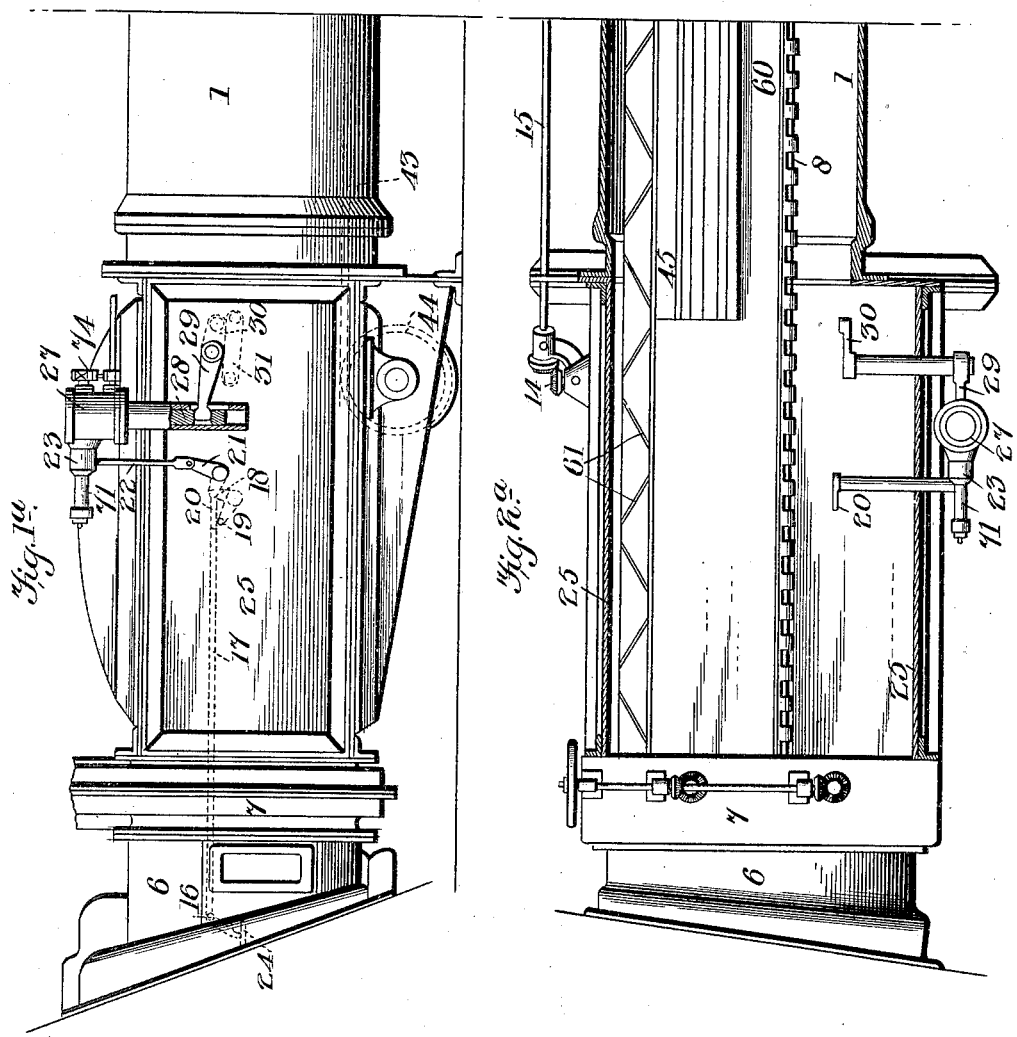

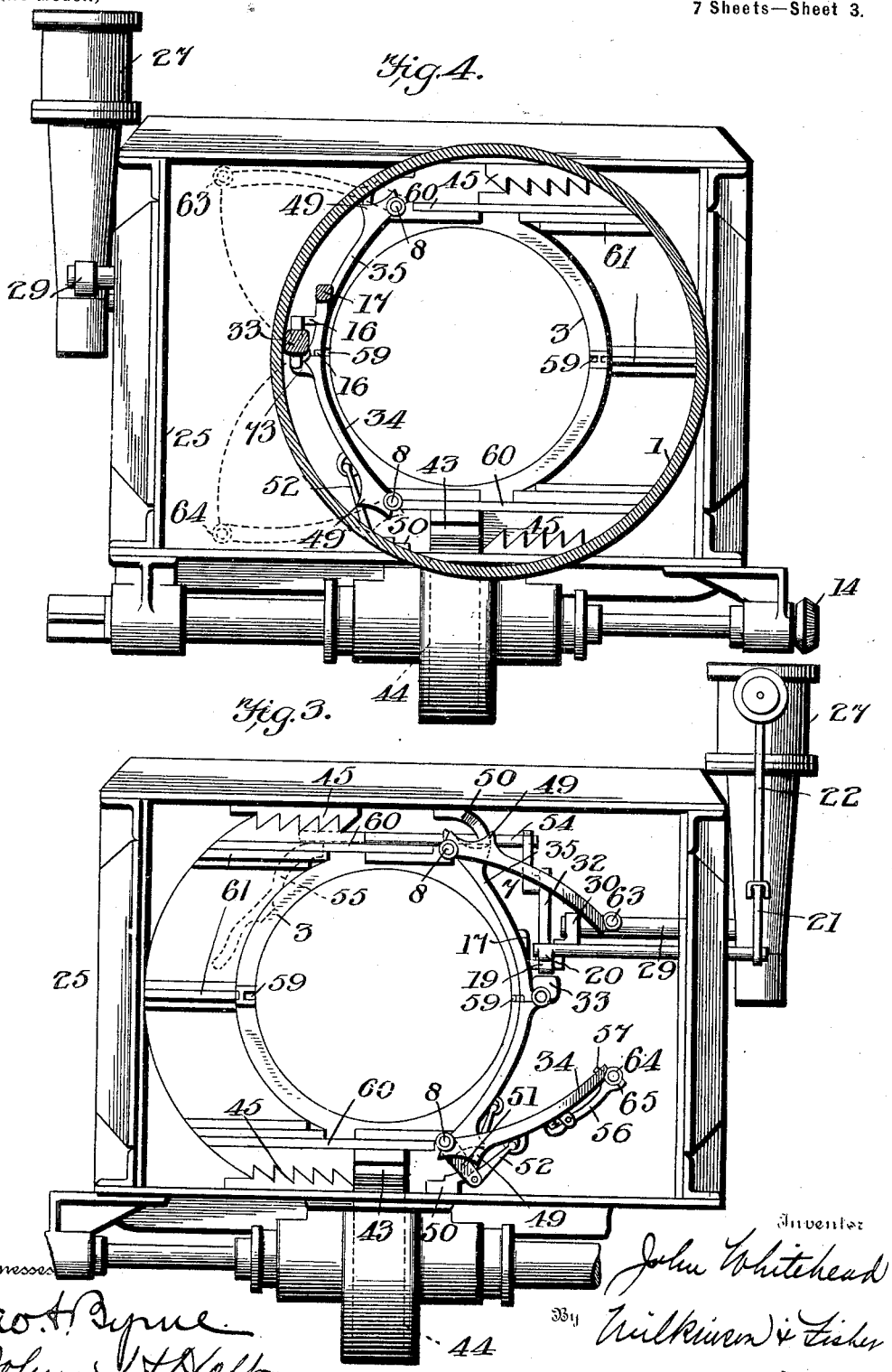

No. 697,906. Patented Apr. 15, 1902.
J. WHITEHEAD.
TORPEDO LAUNCHING APPARATUS.
(Application filed July 24, 1901.)
(No Model.) 7 Sheets—Sheet 4.
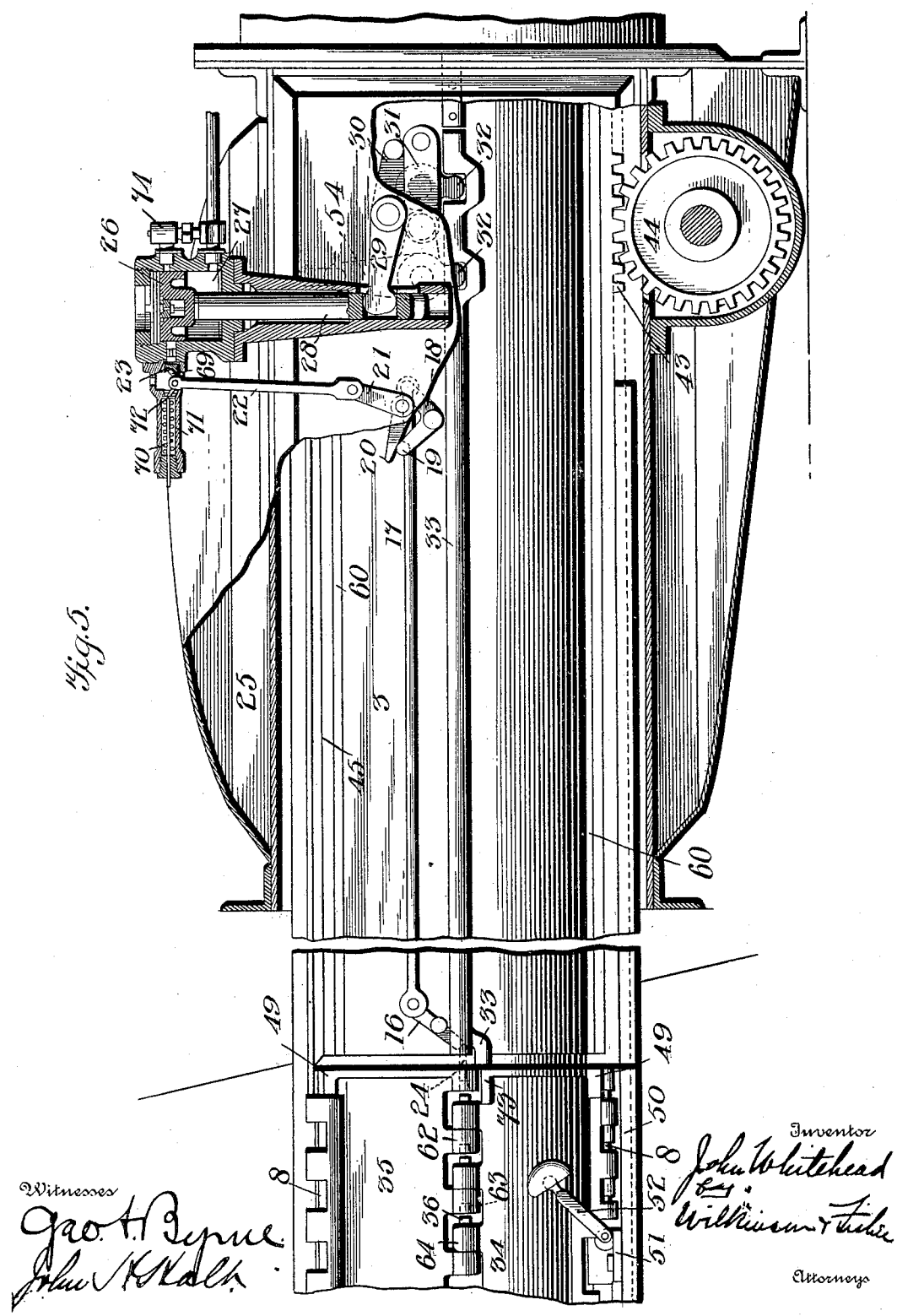

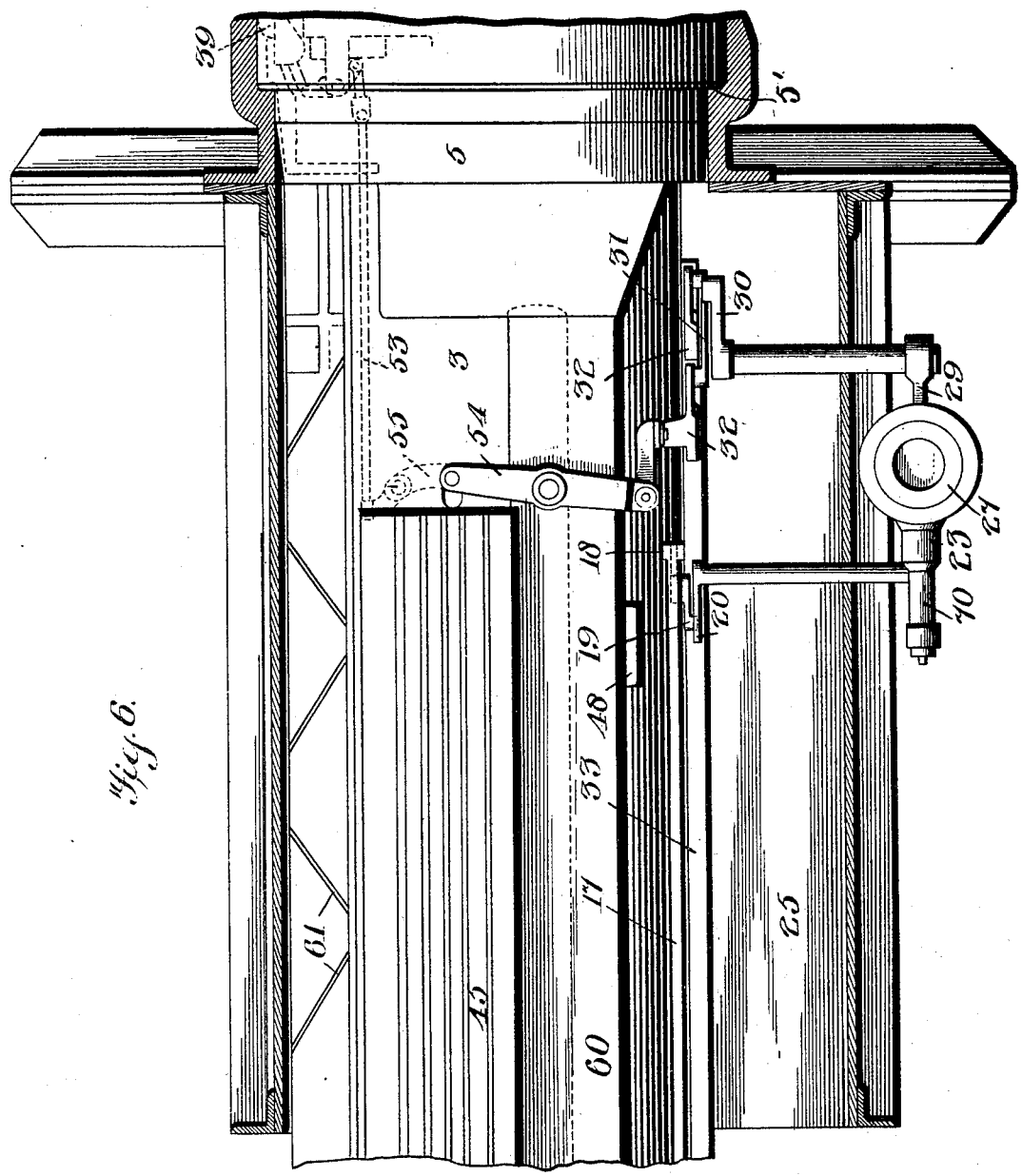

No. 697,906. Patented Apr. 15, 1902.
J. WHITEHEAD.
TORPEDO LAUNCHING APPARATUS.
(Application filed July 24, 1901.)
(No Model.) 7 Sheets—Sheet 6.
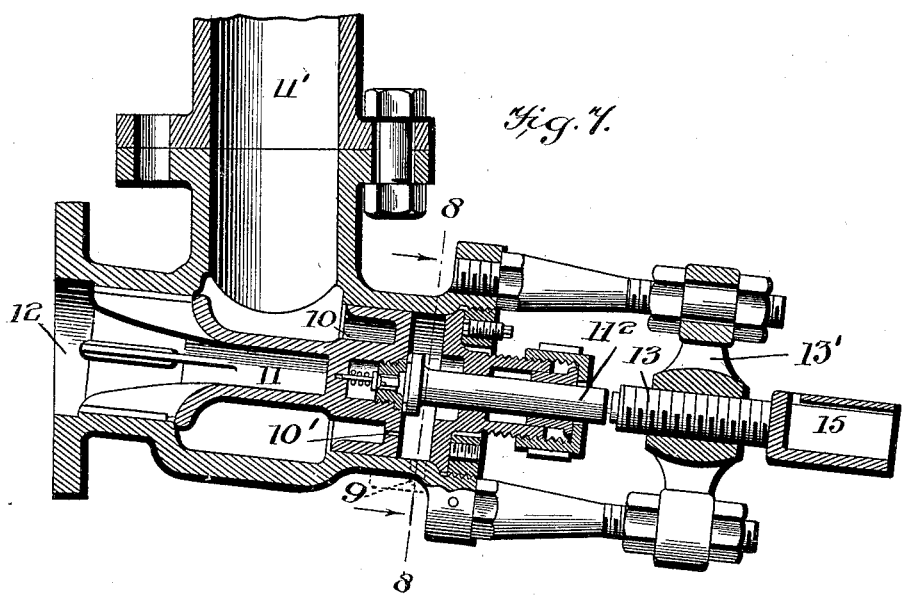
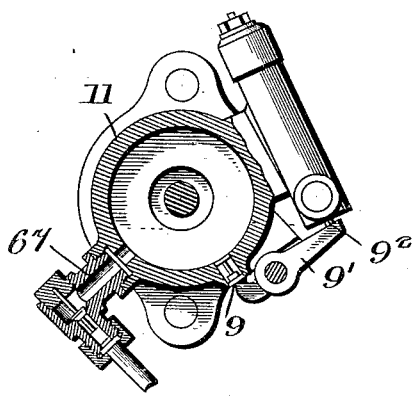
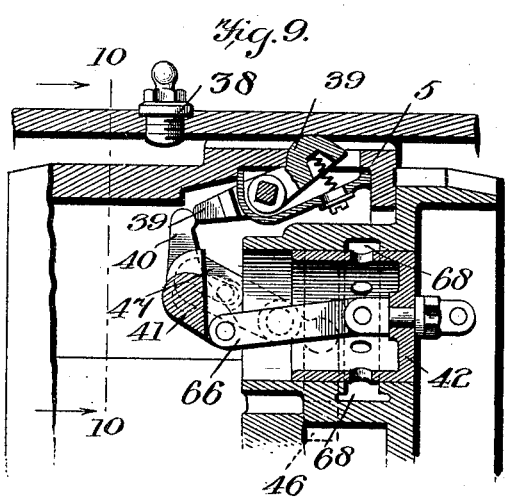
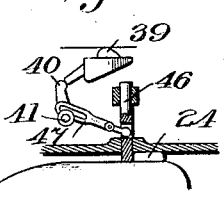
Witnesses
Inventor
John Whitehead
By Wilkinson & Fisher
Attorneys No. 697,906. Patented Apr. 15, 1902.
J. WHITEHEAD.
TORPEDO LAUNCHING APPARATUS.
(Application filed July 24, 1901.)
(No Model.) 7 Sheets—Sheet 7.
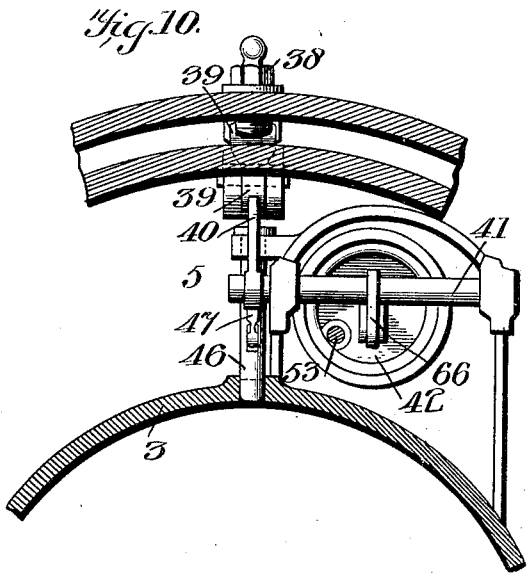
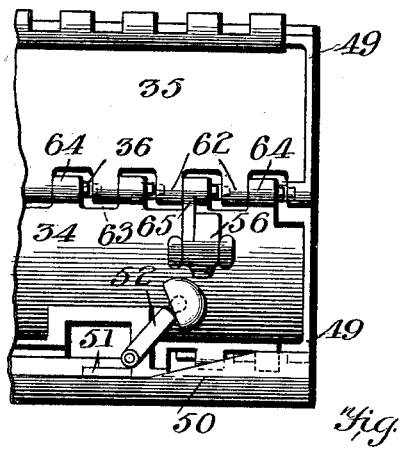
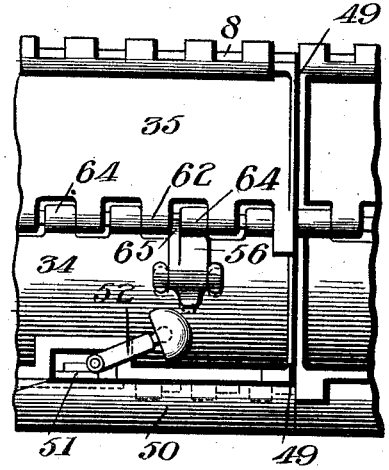
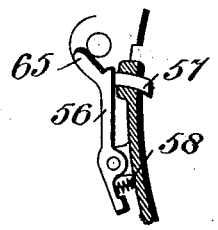

UNITED STATES PATENT OFFICE.

JOHN WHITEHEAD, OF FIUME, AUSTRIA-HUNGARY.

TORPEDO-LAUNCHING APPARATUS.

SPECIFICATION forming part of Letters Patent No. 697,906, dated April 15, 1902.

Application filed July 24, 1901. Serial No. 69,534. (No model.)

*To all whom it may concern:*

Be it known that I, JOHN WHITEHEAD, a subject of the King of Great Britain, residing at Fiume, in the Empire of Austria-Hungary, have invented certain new and useful Improvements in Torpedo - Launching Apparatus; and I do hereby declare the following to be a full, clear, and exact description of the invention, such as will enable others skilled in the art to which it appertains to make and use the same.

This invention relates to improvements in torpedo-launching apparatus, and is designed especially as an improvement upon the invention shown and described in Letters Patent No. 608,814, granted to me August 8, 1898.

In the apparatus for launching torpedoes under water from the broadside of a ship in motion described in the above-mentioned patent a guiding-shield of U-shaped cross-section is attached to the front end of the torpedo-tube and is adapted to be pushed out lengthwise into the water, with its open side turned against the current of the water—that is, toward the bow of the vessel—the rear side of the casing being formed of folding doors. In launching the torpedo the tube containing it, together with the casing, is pushed out into the water, the folding doors at the back of the casing being closed and locked. The torpedo is then shot off, and as soon as it has completely passed into the guiding-shield and is supported thereby, and thus protected against the sidewise pressure of the water, the doors are unlocked, and being thus unlocked are opened by the sidewise pressure of the water and in this manner instantaneously uncover the torpedo throughout its whole length, so that now finding itself free in the water the torpedo can pursue its course unimpeded. The torpedo-tube, with the guide-shield, is then drawn back into the interior of the vessel, the outer end of the casing closed, and the water which has passed into the casing removed, when the apparatus will be ready for the reception and launching of another torpedo.

The object of the present invention is to simplify the apparatus above described and render the same more effective.

According to the present invention after the torpedo-tube and guiding-shield have been set in motion the several operations, including the stopping of the torpedo in the firing position, the driving of the torpedo out of the tube, and the unlocking of the doors, are all entirely automatic. Also the return of the torpedo-tube and guiding-shield and the closing and locking of the doors take place automatically by utilizing the hydrostatic pressure of the water. These constitute important improvements upon the manually-operated apparatus described in the above-mentioned patent, since such apparatus necessarily requires more time than the automatic apparatus for its operation. In battle the favorable opportunity for delivering a torpedo usually arises quite unexpectedly and lasts but a few moments.

My present invention further comprises means for holding the guiding-shield extended without the side strain produced by the water interfering with the steering of the torpedo and various other structural improvements, which will be hereinafter fully described, and pointed out in the claims.

Referring to the accompanying drawings, Figure 1 is an elevation of the apparatus, partially in vertical section. Fig. 1$^a$ is a continuation of the same. Fig. 2 is a top plan view, partially in horizontal section. Fig. 2$^a$ is a continuation of the same. Fig. 3 is an end view of the apparatus as seen from the left of Figs. 1 and 2 with the water-valve left off. Fig. 4 is a section on the line 4 4 of Fig. 1. Fig. 5 is enlarged side elevation, partly in section, of the outer end of the apparatus, showing the parts of the apparatus in the firing position and the casing broken away. Fig. 6 is a top plan view of the parts shown in Fig. 5, the casing being shown in section. Fig. 7 is a longitudinal section of the valve for letting compressed air into the torpedo-tube casing. Fig. 8 is a section on line 8 8 of Fig. 7. Fig. 9 is an enlarged longitudinal section of the valve for letting compressed air into the torpedo-tube. Fig. 10 is a section on the line 10 10 of Fig. 9. Fig. 11 shows the torpedo-retaining device. Figs. 12 and 13 are side elevations of the doors in two different positions. Fig. 14 is a detail view of the safety device.

Similar numerals refer to similar parts throughout the several views.

In the hull of the ship there is firmly fixed the torpedo-tube casing, which consists of two parts, the rear or inner part 1, (see Figs. 1 and 2,) which is cylindrical in shape, and the front or outer part 25, (see Figs. 1ª and 2ª,) which constitutes an enlargement, rectangular in cross-section. The cylindrical part 1 is closed at its rear or inner end by a detachable cover 2 in any suitable manner. For instance, the cover 2 may be provided with a slotted screw-thread engaging into a correspondingly-slotted female screw-thread in the part 1, as is in general use in breech mechanism for guns of the slotted-screw type. The cylindrical torpedo-tube 3 is closed in a similar manner at its inner or rear end by a cover 4, and immediately in front of this cover it is provided with a cylindrical enlargement 5, tightly fitting the cylindrical portion of the torpedo-tube casing.

On the top and bottom of the torpedo-tube 3 are firmly secured horizontal plates 60, (see Figs. 3 and 4,) provided with longitudinal guide-ribs 45, engaging corresponding guiding-ribs on the inside of the top and bottom of the enlargement 25. The plates 60 are connected at one side (that toward the bow of the ship) by open lattice-work 61 to strengthen and stiffen them, and at the other side (that toward the stern of the ship) and in front of the front or outer end of the tube 3 they carry hinge-bars 8 8, which are parallel to the longitudinal axis of the torpedo-tube and upon which are hinged the upper and lower halves or wings 35 and 34, respectively, of the folding doors. The parts 60 61 8 34 35 constitute what is called the "guiding-shield," which as a whole is secured to the tube 3, and, as is seen from the foregoing, the tube 3 and the guiding-shield are guided longitudinally in the torpedo-tube casing 1 25 on the one hand by the piston 5 and on the other hand by the guide-ribs 45. The folding doors of the guiding-shield are divided longitudinally into independent sections, each section consisting of an upper half or wings 35 and a lower half 34. The upper halves 35 are prevented from shifting along their hinge-bars 8, and each of them is provided at its lower edge with tooth-like projections 62, so that such lower edge resembles a rack. Each of these projections 62 is provided at the front side (that away from the torpedo-tube 3) with a recess 63. (See Fig. 12.) The upper edges of the lower halves or wings 34 are similarly provided with tooth-like projections 64, each of which is provided at its rear side (that toward the tube 3) with a lug 36. The space between adjacent projections 62 of the upper halves are so large that when the two halves or wings 34 35 of a section are folded up or closed projections 64 with the lugs 36 can freely enter between the projections 62, as shown in Fig. 12. The lower halves or wings are movable along their hinge-bar 8, so that when the halves or wings are in the position shown in Fig. 12 the lower wings may be moved toward the tube 3, whereby the lugs 36 enter into the recesses 63, thus locking the two halves or wings of each section in the closed position. (Shown in Fig. 13.) The upper wings of the section of the folding doors are permanently in immediate contact with each other, and the lower halves or wings are in immediate contact with each other when in the closed and locked position, so that on pushing outward the lower half or wing 34 which is next to the outer or front end of the tube 3 all the lower halves or wings are compelled to move in the same direction and through the same distance along their hinge-bar 8, whereby all the sections of the folding doors become unlocked simultaneously, all the lugs 36 being disengaged from the recesses 63.

On the lower wing 34 of the outermost section of the folding door there is pivoted a lever 56, provided with a projection 65, engaging, under the action of a spring 58, the rear side of a projection 62 and the front side of the adjacent projection 64 of the upper and lower wings, respectively, when the wings of this section are closed and locked, as shown in Fig. 13. A nose 57 on the lever 56 projects inward through the lower wing 34 and is adapted to be struck by the torpedo and release the doors, so that they may be unlocked. This feature will later be described in greater detail.

Guiding-grooves 59 for the horizontal rudder of the torpedo are provided in the torpedo-tube 3 and extend along the lattice-work 61 and the doors 34 35, as shown in Figs. 3 and 4. These guiding-grooves are of course diametrically opposite each other in a horizontal plane.

Referring to Figs. 1ª and 2ª, 6 indicates the mechanism for closing the outer or front end of the casing, the outer cover-plate of which is flush with the outer skin of the vessel when such mechanism is closed, and 7 is the water slide-valve in the casing. These latter parts 6 7 may be of any known or preferred construction, and as they do not form a part of the present invention they need not be more fully described.

9 is the firing-valve.

10 is a piston connected to a valve 11, controlling the connection between the tube 12, leading to the torpedo-tube casing in rear of the piston 5, and any suitable reservoir of compressed air.

13 is a screw for regulating and limiting the opening of the valve 11.

15 is a rod secured to the screw 13 and carrying at its front end, Fig. 2ª, a bevel-wheel meshing with another bevel-wheel 14 on the axis of a pinion 44, journaled in the casing and engaging with a rack 43 on the under side of the torpedo-tube.

16 is a lever pivoted to the torpedo-tube 3, and its lower end reaches through a suitable aperture at the front end of the torpedo-tube into the guiding-groove 59, Figs. 3 and 4, and while its upper end is connected by a rod 17, arranged outside and alongside the tube 3, with another lever 18, (see Fig. 5,) pivoted to the torpedo-tube 3 and provided with an outwardly-projecting pin 19. A two-armed lever 20 21 is pivoted to the part 25 of the torpedo-tube casing, the arm 20 being arranged inside that part and arm 21 outside of the same. This arm 21 is connected, through a rod 22, with a valve 23, controlling the escape of compressed air from the upper end of a cylinder 27, the piston 26 of which is connected, through the piston-rod 28, with the outside arm 29 of a lever pivoted to part 25 of the torpedo-tube casing. The other arm 30 of the said lever is inside the part 25.

31 is a bar parallel to the axis of the torpedo-tube 3. This bar is supported by two levers 32, pivoted on the outside of the torpedo-tube parallel to its axis and abutting against the innermost of the lower doors of the guiding-shield.

38 (see Figs. 9 and 10) is a bolt projecting into the interior of part 1 of torpedo-tube casing at the outer end thereof next to the enlarged portion 25, and 39 is a lever pivoted in the piston 5, engaging at one end with one arm 40 of a rocking shaft 41, another arm of which is connected by means of a rod 66 with a piston-valve 42, while a third arm of shaft 41 is connected by a rod 47 with a pin 46, locking the torpedo in position in the torpedo-tube 3. The shaft 41 and the parts connected therewith are located in the body of piston 5.

The projections 49 on the upper edge of the upper halves or wings 35 and on the lower edges of the lower halves or wings 34 are adapted to engage with guiding-rails 50 in the enlargement 25. The levers 51, pivoted to the hinge-bar 8 of the lower halves or wings, are connected by pivoted rods 52 to the said lower doors and also adapted to engage with the guiding-rails 50.

54 55 are levers pivoted to the torpedo-tube and act to restore the piston-valve 42 to its initial position after the torpedo has been fired, and 48 48$^a$ are the usual lugs projecting into the interior of the torpedo-tube for starting the propelling-motor of the torpedo when the latter is being fired.

When the apparatus is not in use, the torpedo-tube 3 and the guiding-shield secured to it are fully drawn back into the torpedo-tube casing, so that the piston 5 and cover 4 are in close proximity to the rear cover 2 of the torpedo-tube casing and the front or outer end of the guiding-shield is within the enlargement 25. The outer end of the torpedo-tube casing is closed at 6, and also the water slide-valve 7 is closed to exclude water from the interior of the apparatus. The doors of the guiding-shield are closed, the wings or halves 34 35 of all the sections of such doors being folded up and locked. Then after removing the covers 2 and 4 the torpedo may be introduced into the torpedo-tube 3, so that its horizontal rudder enters into the horizontal guiding-grooves 59. The pin 46, projecting with its lower end into one of these guiding-grooves, serves as a stop for preventing the torpedo from being pushed too far into the tube 3 and for locking it in position therein. (See Fig. 11.) Air under pressure is admitted from a suitable reservoir to the casing of the valve 11, Figs. 7 and 8, and also in rear of the piston 10. This may be conveniently done by opening a small valve 67, arranged between the said reservoir and the space in rear of the piston 10, so that air under pressure acts in the first instance on the rear side of the piston 10, thereby forcing the valve 11, rigidly connected to this piston, against its seat, and then leaks through a small hole 10' in the piston into the chamber of the valve 11 until the pressures on both sides of the piston are equal to the pressure in the reservoir. The valve 67 may be closed, and direct communication between the reservoir and the chamber of the valve 11 may be established by opening a suitable valve (not shown) located in the passage 11'. The torpedo having been introduced into the tube 3, the valve 11 having been closed, and the chamber of said valve, as also the space in rear of the piston 10, having been filled with air under pressure, as above described, and the outer closing mechanism 6 and the water slide-valve 7 having been opened, everything is ready for firing the torpedo. The latter is effected by opening a valve 9, Figs. 7 and 8, either by hand or by electric means, from the captain's bridge in the usual manner—that is to say, the pivoted arm 9', which operates the valve 9, is actuated by a plunger $9^2$, which may be operated by a solenoid or by fluid-pressure or any convenient way from the bridge of the vessel. The rear side of the piston 10 is thus relieved from air-pressure while the front end of the same is under the action of the compressed air admitted from the reservoir. Now the sectional area of the piston 10 is greater than that of the valve 11, and thus the piston 10 is forced back by the air under pressure until the end of the piston-rod $11^2$ strikes against the end of the screw 13, working in a yoke 13', rigidly secured to the frame of the apparatus. Thereby the valve 11 is opened a little and the air under pressure rushes from the reservoir through the connection 12 into the torpedo-tube casing 1 in rear of the piston 5. The torpedo-tube 3 is thus set in motion in the torpedo-tube casing 1; but as the valve 11 is opened a little only, and therefore the air under pressure strongly throttled in passing through said valve, the movement of the torpedo-tube is very slow at the beginning. Consequently this tube is started quietly and without shock, which is very important, as otherwise derangement and even breakage of the apparatus might occur. Then as the torpedo-tube, with the torpedo in it, and the guiding-shield begin to move along the torpedo-tube casing the rack 43, secured to the torpedo-tube and guiding-shield and engaging with the gear-wheel 44; journaled on the casing, turns this gear-wheel. By this means motion is transmitted through a bevel-gear 14 to a spindle 15, journaled to the casing and connected to the screw 13 by key and groove or in any equivalent manner. The screw 13 then turns in such a direction that it recedes from the piston 10, and as the latter is still under the action of the air under pressure on its front side, while its rear side is substantially under atmospheric pressure, (the leaking of the compressed air through the small hole in the piston to the rear side thereof taking place comparatively slowly,) the piston 10 will follow the screw 13, and thus the valve 11 will open the wider the farther the torpedo-tube has advanced in the torpedo-tube casing. The throttling of the compressed air rushing into the torpedo-tube casing being thus gradually diminished, this tube will reach the outer end of its course in a comparatively short time, but without shock or sudden change of speed. During the outward movement of the torpedo-tube the said tube and the guiding-shield are guided in the casing 1 25 by ribs 45, as above stated. At the end of its outward course the torpedo-tube is stopped by its piston 5 striking against an inner shoulder 5' at the outer end of the cylindrical portion 1 of the torpedo-tube casing. (See Fig. 6.) The lower lugs 34 of the doors of the shield are, however, prevented from shifting along their hinge-bar 8 by their momentum by the aforementioned lever 56 on the outermost of these wings, the projection 65 of which lever engages between the projections 62 64 of the upper and lower wings of the outermost section of the guiding-shield door. In this position the full length of the guiding-shield projects into the water, with the lattice-work 61 toward the bow and the door toward the stern of the vessel, while the pin 19 of lever 18 (see Fig. 5) on the torpedo-tube is under the arm 20 of lever 20 21 in the part 25 of the torpedo-tube casing, and similarly the bar 31 of the torpedo-tube is under the arm 30 of lever 29 30 in the part 25, as shown in Figs. 5 and 6, these parts being suitably located for this purpose. Just before the torpedo-tube reaches the end of its outward course the lever 39, Fig. 9, strikes against the bolt 38, which for this purpose is located near the outer end of the part 1 of the torpedo-tube casing, and thus this lever is tripped, releasing the arm 40 of the rocking shaft 41, Fig. 10, whereby also the piston-valve 42 is released, which is connected with the rocking shaft by link 66. Now as the rear side of the piston-valve is under the action of the compressed air in the torpedo-tube casing, while its front side, being open toward the interior of the torpedo-tube, is acted upon by a pressure not much exceeding that of the atmosphere, the piston-valve 42 will be forced forward, whereby the rocking shaft 41 is turned, which by means of the arm 47 raises the pin 46, Fig. 11, out of engagement with the projection 24 on the horizontal rudder of the torpedo, and thereby releases the latter. The piston-valve 42 then uncovers ports 68 in the wall of its cylinder, whereby communication is established between the torpedo-tube casing and the interior of the torpedo-tube, so that air under pressure rushes into the latter and drives the torpedo out of the torpedo-tube. By this forward movement of the piston-valve 42 a rod 53, secured thereto, is advanced toward the free end of lever 55, pivoted to the torpedo-tube, (see Figs. 2 and 6,) but without turning this lever, which through the medium of another lever 54 is connected with a lever 32, Figs. 1, 2, and 6. During its movement in tube 3 the torpedo is guided by the projections 24 in the grooves 59, and the lugs 48 48$^a$ in the interior of the torpedo-tube 3 start the torpedo-propelling mechanism by striking against corresponding projections on the torpedo in the usual manner. When the torpedo in its forward movement reaches the outermost section of the door of the guiding-shield, its body strikes against the nose 57 of the lever 56, (see Fig. 14,) whereby this lever is forced outward, and its projection 65 comes out of engagement with the projections 62 64 of the upper and lower halves or wings 35 34 of that door-section, thus setting free the lower wings 34 of all door-sections, so that they may be shifted along their hinge-bar 8. At nearly the same moment the horizontal rudder of the torpedo leaves the torpedo-tube, and in doing so the projection 24 on the stern side of the said rudder strikes against the end of the lever 16, projecting into the guiding-groove 59, thus tripping the said lever, as will be seen from Figs. 5 and 6. The rod 17, connected to the other end of lever 16, is thus caused to turn lever 18, so that the pin 19 on the same raises the arm 20 within the casing 25, while the arm 21 outside such casing is depressed. This movement of the arm 21 actuates, through the medium of a link 22, the valve 23, whereby a piston 26, working in the cylinder 27, secured to the casing 25, is caused to move upward. This may be conveniently done by arranging the valve 23 so that when it is opened it permits air under pressure to escape from the space of cylinder 27 above piston 26, while the under side of the latter remains under the action of the air under pressure. Preferably the link 22 acts upon the center of a toggle-lever 69, the ends of which bear on the one hand against the valve 23 and on the other hand against a plate 72, (see Fig. 5,) held against stops in a casing 71 by a spring 70, contained in such casing, so that when the link 22 is drawn downward the toggle 69 is bent downward, and thus the valve 23 is opened. By the upward movement of piston 26, brought about as just described, the outside arm 29 of lever 29 30 is turned upward by the piston-rod 28, and consequently the inside arm 30 of such lever is turned downward, and consequently depresses the bar 31, Figs. 5 and 6. By this the levers 32, supporting bar 31 and pivoted to the topedo-tube, are turned so as to push outward the rod 33, with which they engage and which is guided on the outside of the torpedo-tube. Then as the outer end of this bar bears against a projection 73 on the innermost of the lower wings 34 this latter and also all the other lower halves or wings 34 are shifted along their hinge-bar 8, as shown in Fig. 5. Thus all the door-sections of the guiding-shield are unlocked at the same moment by the lugs 36 being withdrawn from the recesses 63 before the point of the torpedo has passed beyond the front end of the guiding-shield. The whole length of the torpedo is therefore within and protected by the guiding-shield. All of the door-sections being unlocked at the same moment, all will be thrown open by the pressure of the water through which the ship with the shield projecting therefrom is moving. The torpedo will thus continue on its way unimpeded.

It will be observed that during the whole of the firing or launching operation above described the torpedo is supported laterally throughout its entire length in the torpedo-tube and guiding-shield against the water-pressure and is set free throughout its entire length at one instant, so that not for even a moment a part of the length of the torpedo is subject to water resistance acting against one side thereof, just as in the case of the apparatus described in my prior patent, No. 608,814.

When the bar 33 is pushed forward by levers 32, one arm of one of these levers acts through levers 54 55, journaled on the torpedo-tube, against the rod 53, connected to the piston-valve 42, (the free end of this rod 53 having been advanced toward or brought into contact with the free end of lever 55 without turning the latter when the piston-valve 42 was advanced, as above described,) whereby the piston-valve 42 is pushed back into its closed initial position, in which the communication between the interior of the torpedo-tube and the torpedo-tube casing in rear of the piston 5 is interrupted. In this way escape of compressed air after firing the torpedo is prevented. Then the compressed air behind the piston 5 is allowed to escape by suitable valve, the communication between the compressed-air reservoir and the chamber of valve 11 being interrupted simultaneously.

The torpedo-tube is forced inward by the hydrostatic pressure of the water rushing into it after the torpedo has been shot out, taking with it the guiding-shield, the doors of which are still open—i. e., the wings 34 35 folded outward, as shown in full lines in Fig. 3. The halves or wings 34 35 next to the torpedo-tube pass first into the part 25 of the casing, which of course must be wide enough to permit them to enter. The projections 49 on the doors run along the cam-guide rails 50, Figs. 3 and 12, secured to the top and the bottom wall of the said casing, whereby first the upper and then the lower wing or half 35 34, respectively, are turned into the closed position. Then a lever 51, (see Figs. 5, 12, and 13,) turning on the hinge-bar 8 of the lower wing 34, but prevented from moving along the same and arranged at a suitable distance in front of the projection 49, reaches the lower cam-guide rail 50 and is thereby turned upward. The outer end of this lever is connected by a link 52 with the lower wing, and therefore when the lever 51 is turned upward the wing or half 34 is moved toward the tube 3, whereby the lugs 36 are caused to enter the recesses 63, and thus the wings 35 34 next to the tube 3 are locked in their closed position. Similarly all the sections of the door of the guiding-shield are closed and locked as they pass successively through the casing 25. In the case of the outermost section, however, projection 65 of lever 56 strikes against one of the projections 62 of the upper wing 35, and thus this lever is forced back. Then when the lower wing is shifted along the hinge-bar 8 the projection 65 slides along the projection 62 and finally drops into the space between the latter and the adjacent projection 64, when the two wings or halves are locked against accidental shifting along the hinge-bar 8. When the lower wing 34 next to the tube 3 is pushed toward the latter, as just described, it pushes back the bar 33, and thereby restores the levers 32 32 and the bar 31 to their initial positions. By this movement the levers 54 55 also are returned to their initial positions, so that the free end of lever 55 is withdrawn sufficiently from the free end of rod 53 to enable the piston-valve 42 and rod 53 to be moved forward on firing the next torpedo without turning the lever 54 44 and shifting the bar 33. During the inward movement of the torpedo-tube and guiding-shield the rack 43, secured to the bottom of the tube, turns the pinion 44 in a direction opposite to that in which it was turned when the torpedo-tube and the guiding-shield were driven outward for firing the torpedo, and consequently the bar 15 turns the screw 13, so that the latter is advanced toward the casing of valve 11. As the free end of this screw is in contact with the free end of the rod of piston 10, this latter, together with the valve 11, is advanced toward the seat of the valve; but of course this valve is not fully seated by this movement. In order to accomplish this, air under pressure must be admitted in rear of the piston 10 by the valve 67 by hand. The torpedo-tube 3 and the guiding-shield having now fully reëntered the torpedo-tube casing, the front closing mechanism 6 and the water slide-valve 7 are closed, and the water is removed from the torpedo-tube casing and the torpedo-tube in any known manner. After firing the torpedo the levers 16 and 18 and rod 17 are restored to their initial positions by a suitable spring connected to one of these parts or any other convenient means, and the valve 23 is closed by a suitable spring or other means operating to raise arm 21 and link 22, so that the toggle-lever 69 is straightened. As the rear end of this toggle-lever bearing against the plate 72 is acted upon by spring 70, an elastic seating of the valve 23 is insured. It only remains to restore the piston 26 and the parts connected therewith to their initial position by forcing down the said piston, which is accomplished by admitting air under pressure to the top side of this piston, as by opening by hand a valve or cock in a branch pipe 74, leading to the upper end of the cylinder 27. The whole apparatus having been restored to its initial position, a fresh torpedo may be charged into the same and fired, as above described. The return of the torpedo and the guiding-shield into the torpedo-tube casing may also be effected by turning the pinion 44 by hand, if, for instance, the hydrostatic pressure of the water should not be sufficient to move back the parts.

Having thus described my invention, what I claim, and desire to secure by Letters Patent of the United States, is—

1. In an apparatus for firing off torpedoes under water from the broadside of moving vessels in combination with a torpedo-tube casing and a torpedo-tube adapted to move therein a piston at the rear or inner end of the torpedo-tube tightly fitting the inner cylindrical end of the torpedo-tube casing and a torpedo guide-shield composed of folding doors secured to the front end of the torpedo-tube, a valve for admitting fluid under pressure into the casing in rear of the torpedo-tube, and means for increasing the width of the passage uncovered by the said valve progressively as the torpedo-tube moves outward in the casing, substantially as described.

2. In an apparatus for firing off torpedoes under water from the broadside of moving vessels in combination with a torpedo-tube casing, a torpedo-tube having a piston at its rear end tightly fitting the inner cylindrical end of the torpedo-tube casing and a guiding-shield at its front end, a valve for admitting fluid under pressure into the casing in rear of the torpedo-tube, a screw connected with such valve, a rack on the torpedo-tube, a pinion journaled on the torpedo-tube casing and engaging with such rack, and gearing intermediate between the said pinion and the screw, substantially as and for the purpose set forth.

3. In an apparatus for firing off torpedoes under water from the broadside of moving vessels in combination with a torpedo-tube casing, a torpedo-tube having a piston at its rear end tightly fitting the inner cylindrical end of the torpedo-tube casing, a series of the upper doors hinged on bars secured to the front end of the torpedo-tube and parallel to the axis of such tube a series of lower doors hinged on and adapted to move along bars secured to the front end of the torpedo-tube, locking-lugs secured to the upper edge of the lower doors and adapted to enter lengthwise into holes in the lower edge of the upper doors, and means for turning both sets of doors on their hinge-bars and for moving the lower doors along their hinge-bar substantially as and for the purpose described.

4. In an apparatus for firing off torpedoes under water from the broadside of moving vessels in combination with a torpedo-tube casing having an enlarged rectangular, outer end and a cylindrical inner portion, a torpedo-tube having a piston at its rear end tightly fitting the inner cylindrical end of the torpedo-tube casing a series of the upper doors hinged on bars secured to the front end of the torpedo-tube and parallel to the axis of such tube, a series of the lower doors hinged on and adapted to move along bars secured to the front end of the torpedo-tube locking-lugs secured to the upper edge of the lower doors and adapted to enter lengthwise into holes on the lower edge of the upper doors, means for turning both sets of doors on their hinge-bars, means for moving the lower doors outward along the hinge-bars an arm adapted to turn on the hinge-bar of each of the lower doors, a link connecting such arm with the lower door, and a guide-rail in the enlarged front end of the torpedo-tube casing for the said arm to slide upon substantially as and for the purpose described.

5. In an apparatus for firing off torpedoes under water from the broadside of moving vessels in combination with a torpedo-tube casing having an enlarged rectangular outer end and a cylindrical inner portion, a torpedo-tube having a piston at its rear end tightly fitting the inner cylindrical end of the torpedo-tube casing a series of upper doors hinged on bars secured to the front end of the torpedo-tube and parallel to the axis of such tube, a series of lower doors hinged on and adapted to move along bars secured to the front end of the torpedo-tube, locking-lugs secured to the upper edge of the lower doors and adapted to enter lengthwise into holes on the lower edge of the upper doors, means for turning both sets of doors on their hinge-bars, a lever pivoted to the torpedo-tube adapted to be engaged by a projection on the torpedo-tail when the latter leaves the torpedo-tube, a rod guided on the torpedo-tube and adapted to push outward the lower doors along their hinge-bar, link-and-lever gearing carried by the torpedo-tube casing with pneumatic-power-furnishing devices such link-and-lever gearing with the pneumatic device being adapted to transmit motion from the said lever to the said rod and means for moving the lower doors, inward along the hinge-rods, substantially as and for the purpose described.

6. In an apparatus for firing torpedoes under water from the broadside of ships a guiding-shield comprising a set of upper doors hinged at the top to a bar parallel to the axis of the torpedo-tube, a set of corresponding lower doors hinged at the lower edge on and movable along a bar parallel to the axis of the torpedo-tube, projections on the upper edge of the lower doors carrying locking-lugs adapted to enter lengthwise into holes in projections on the lower edge of the upper doors and a spring-actuated lock-lever pivoted to either of the doors and adapted to enter between the projections of the upper and lower doors and to be forced out from between such projections by the torpedo on its entering the guide-shield substantially as and for the purpose described.

In testimony whereof I affix my signature in presence of two witnesses.

JOHN WHITEHEAD.

Witnesses:
ALVESTO S. HOGUE,
AUGUST FUGGER.